United States Patent [19]

Woodworth

[11] 3,826,977
[45] July 30, 1974

[54] TEST SET FOR TRACING AND CHECKING THE CONTINUITY OF ELECTRICAL CIRCUITS

[76] Inventor: Chris C. Woodworth, 600 S. Dobson Rd., Suite 45, Mesa, Ariz. 85202

[22] Filed: May 24, 1973

[21] Appl. No.: 363,426

[52] U.S. Cl............ 324/51, 324/52, 324/66
[51] Int. Cl............................. G01r 31/08
[58] Field of Search........... 324/51, 52, 66; 331/111

[56] References Cited
UNITED STATES PATENTS

| 2,890,353 | 6/1959 | Overbeek et al. | 331/111 X |
| 3,441,842 | 4/1969 | Sturm | 324/52 |
| 3,488,580 | 1/1970 | Anderson et al. | 324/52 |
| 3,728,620 | 4/1973 | Heins | 324/52 |

Primary Examiner—Gerard R. Strecker
Attorney, Agent, or Firm—Cahill, Sutton & Thomas

[57] ABSTRACT

Apparatus is disclosed for locating and tracing an electrical path through electrical conductors. A signal generator producing a multi-harmonic signal is connected to an electrical conductor under test. The signal includes amplitude modulated harmonics in the AM broadcast band whereby standard AM radio receivers can be used to detect the conductor transmitting the signal. Selectively energized additional circuitry provides a visual indication of a continuity check performed on the electrical conductor.

5 Claims, 1 Drawing Figure

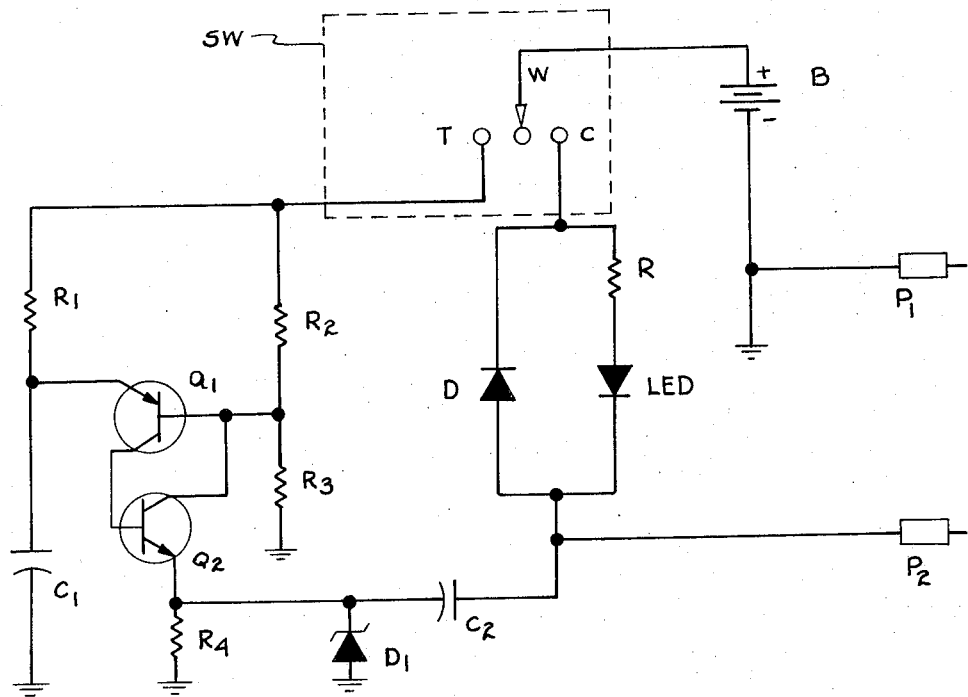

TEST SET FOR TRACING AND CHECKING THE CONTINUITY OF ELECTRICAL CIRCUITS

The present invention relates to electrical test sets, and more particularly, to test sets for locating electrical conductors and testing the electrical path in electrical circuits.

Continuity test sets, as such, are well known in the art. They primarily include an electrical power source in series with an indication and the electrical circuit in question. The indicating means provides a determination of whether the circuit under test is open or short circuited.

Other presently known test sets include circuitry for generating an intermittent or cyclical tone output. The output is fed into the circuit in question and detected at a remote location if the circuit is not open circuited. Such devices are generally unsatisfactory when used in conjunction with telephone terminal boards for several reasons. First, when the injected signal is attempted to be located in such a board, the test probes are generally only momentarily in contact with each of the terminals and the time of contact may coincide with the absence of the injected tone. Therefore, an erroneous indication may be obtained. Second, the tone frequency may not be compatible with the telephone switching equipment and may cause errorneous indications or may damage the switching equipment. If the test tone is essentially a single frequency tone, it is practically impossible to use the prior art test sets to detect buried lines because of the difficulty in making a positive electrical connection with the buried line.

It is therefore a primary object of the present invention to provide a multi-purpose test set for tracing electrical conductors.

Another object of the present invention is to provide a test set for detecting inaccessible electrical conductors.

Yet another object of the present invention is to provide a visual and audible indication of the continuity of an electrical conductor.

Still another object of the present invention is to provide a test set generating a frequency modulated tone for use in locating buried electrical conductors.

A further object of the present invention is to provide a dual mode electrical continuity test set.

These and other objects of the present invention will become apparent to those skilled in the art as the description thereof proceeds.

The present invention may be described with further specificity and clarity with reference to the sole FIGURE illustrating the circuit of the present invention.

The present invention serves two primary functions. First, the circuit can be used to check the continuity of an electric circuit. Second, the present invention may be used to inject a frequency modulated tone into an electrical conductor. The tone is detected at a remote location by a radio receiver, which detection identifies the line carrying the tone.

For the sake of simplicity and clarity, the circuitry affording a check of the continuity of an electric circuit will be described first. The positive terminal of a battery B is connected to the Wiper arm W of a single pole double throw (SPDT) switch SW. A grounded probed P1 is connected to the negative terminal of battery B. Terminal C of switch SW is connected to probe P2 through a resistor R in series with a light emitting diode LED. A diode D is connected in parallel with resistor R and diode LED to prevent a reverse bias of the light emitting diode.

When the wiper arm W of switch SW is switched to terminal C, probes P1 and P2 are energized and a continuity check of an electrical circuit may be made. If the circuit is electrically intact, the diode LED will light. Conversely, if the circuit is open circuited no current will flow through the light emitting diode.

Where a continuity check of an electrical conductor cannot be made because one end of the conductor is inaccessible, or where the respective ends of a conductor must be determined from a large bundle of conductors, the second part of the present invention can be used. The second part of the invention includes an oscillator for generating a harmonic rich tone and is energized by switching the wiper arm W of switch SW to terminal T.

The voltage divider network, formed by resistors R2 and R3, is connected to terminal T. The base electrode of PNP transistor Q1 is connected to the junction point of resistors R2 and R3. The values of resistors R2 and R3 are selected to provide a voltage of approximately 67 percent of the battery voltage at the base electrode of transistor Q1. A voltage charging circuit formed by resistor R1 and capacitor C1 is also connected to terminal T. The junction point intermediate resistor R1 and capacitor C1 is connected to the emitter electrode of transistor Q1. The collector electrode of transistor Q1 is connected to the base electrode of NPN transistor Q2. The collector electrode of transistor Q2 is connected to the base electrode of transistor Q1. The emitter electrode is connected to probe P2 through d-c blocking capacitor C2. The emitter electrode of transistor Q2 is grounded through the current limiting resistor R4. Probe P2 is grounded through Zener diode D1 to prevent damage to the transistors from an over voltage condition existing in the line or circuit under test.

In operation, the divider network, resistors R2 and R3 provide a reference voltage to the base electrode of transistor Q1. Capacitor C1 is charged through resistor R1 until the voltage at the emitter electrode of transistor Q1 is equal to the reference voltage plus the voltage drop between the base and emitter electrodes of transistor Q1. At that point, transistor Q1 conducts and the collector current from transistor Q1, applied to the base of transistor Q2, causes transistor Q2 to conduct. The value of the collector current of transistor Q2 will be approximately equal to the emitter current of transistor Q1 times the beta of transistor Q2.

The effect of the current flowing through the collector electrode of transistor Q2 is that of reducing the reference voltage applied to the base electrode of transistor Q1. As the reference voltage is lowered, transistor Q1 draws a proportionally greater current from the charging circuit, resistor R1 and capacitor C1, and the current increase will continue until transistor Q2 becomes saturated. When transistor Q2 is saturated, the reference voltage applied to the base electrode of transistor Q1 will reduce to near ground potential. As the voltage at the emitter electrode transistor Q1 follows the reference voltage, the current flowing through the emitter electrode increases and rapidly discharges capacitor C1. When capacitor C1 is discharged, only resistor R1 supplies current to the emitter electrode of transistor Q1 and it is not capable of supplying sufficient current to maintain transistor Q2 in saturation.

When transistor Q2 becomes unsaturated, the reference voltage will increase. The corresponding voltage increase on the emitter electrode of transistor Q1 due to the charging of capacitor C1 lags behind the reference voltage increase. Thus, transistor Q1 becomes reverse biased and ceases to conduct.

When transistor Q1 ceases to conduct, there is no further current flow to the base electrode of transistor Q2 and it ceases to conduct. Simultaneously, there is no further current flow through the collector electrode of transistor Q2 and the reference voltage at the junction of resistors R2 and R3 is no longer affected by the operation of transistors Q1 and Q2. Therefore, the voltage at the junction point will be reestablished at approximately 67 percent of the battery voltage and the above described cycle begins anew.

The function of resistor R4 connected to the emitter electrode of transistor Q2 is that of limiting the emitter current flow. Thus, resistor R4 limits the current flow from capacitor C1 and establishes the discharge time of the capacitor. It is therefore possible to produce a pulse train output having a predictable duty cycle by careful selection of the values of resistors R1 and R4 and capacitor 1. In the present invention, the values of resistors R1 and R2 and capacitor C1 have been selected to produce a one Khz tone having a 5 percent duty cycle.

The present invention may be expeditiously employed by telephone system installers and telephone repairmen. In example, the continuity of a pair of conductors may be checked by switching the wiper arm of switch SW to the C position and connecting probes P1 and P2 to the conductors in question. If there is an electrical path between the probes, the light emitting diode LED will light. If there is an open circuit the light emitting diode will not light. In addition, the present invention may be used to provide communication between two repairmen, each working at opposite ends of a pair of conductors. In this situation, the probes P1 and P2 are placed in series with the conductors and provides the necessary electrical power to operate head sets and microphones attached to each end of the pair of conductors.

The tone generating circuit of the present invention is useable in several everyday situations encountered by telephone installers and telephone repairmen. In example, by switching wiper arm W of switch SW to contact T and connecting probe P2 to a conductor of a multiconductor cable, the repairmen can locate and identify the conductor at a remote point by probing the conductor of the cable with a probe connected to an earphone until he hears the 1 Khz tone. Where direct testing by electrical contact with one of many conductors at a remote point is not possible, the location of the conductor under test can also be determined with the present invention. The tone generated is formed of a series of pulses having fast rise and fall times resulting in a harmonic rich tone. Some of the harmonics are amplitude modulated and extend into the radio frequency range with the conductor under test acting as a transmitter antenna. These tones can be detected by standard AM broadcast receivers. Thus, the locations of the conductor under test can be located within walls, or even metallic conduits, by placing the broadcast receiver in close proximity to the walls or conduits. The point at which the detected tone is the loudest corresponds to the location of the conductor.

The above-described feature is also useful in determining the pair of conductors under test in a large bundle of conductors. If a probe, sensitive to the radiated energy, is moved in and about the bundle of conductors, the signal picked up will be greatest when the probe is adjacent the conductor under test. Thus, it is possible to locate a conductor within a large bundle of conductors without methodical testing of each and every conductor of the bundle.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An electrical circuit test set for tracing an electrical path through an electrical conductor, said set comprising in combination:
    a. a first circuit for testing the electrical continuity of the electrical conductors, said first circuit including a current limiting resistor in series with a light emitting diode;
    b. a second circuit for generating a tone, said second circuit including:
        1. a voltage divider network for establishing a reference voltage;
        2. a current charging network;
        3. a first semiconductor having a base electrode, an emitter electrode and a collector electrode, said base electrode of said first semiconductor being connected to said voltage divider network and said emitter electrode of said first semiconductor being connected to said current charging network;
        4. a second semiconductor having a base electrode, an emitter electrode and a collector electrode, said base electrode of said second semiconductor being connected to said collector electrode of said first semiconductor, said collector electrode of said second semiconductor being connected to said base electrode of said first semiconductor;
        5. a current limiting resistor connected intermediate said emitter electrode of said second semiconductor and ground;
    c. a d-c power source having a positive terminal and a negative grounded terminal;
    d. a switch for selectively connecting the positive terminal of said power source to said first or second circuit; and
    e. a pair of test probes, one of said probes being connected to the negative terminal of said power source and another of said probes being connected in series with each of said first and second circuits; whereby, said pair of probes are common to both said first and second circuits and the selection of said first or second circuit to be employed is controlled by said switch.

2. The combination as set forth in claim 1 wherein said first and second semiconductors comprise PNP and NPN transistors, respectively.

3. The combination as set forth in claim 2 wherein said other probe is grounded through a Zener diode.

4. The combination as set forth in claim 3 including a d-c blocking capacitor disposed intermediate said emitter electrode of said NPN transistor and said other probe.

5. The combination as set forth in claim 1 including a diode across said resistor and said light emitting diode of said first circuit to prevent reverse bias of said light emitting diode.

* * * * *